US011507683B2

(12) United States Patent
Williams et al.

(10) Patent No.: US 11,507,683 B2
(45) Date of Patent: Nov. 22, 2022

(54) QUERY PROCESSING WITH ADAPTIVE RISK DECISIONING

(71) Applicant: Enveil, Inc., Fulton, MD (US)

(72) Inventors: Ellison Anne Williams, Fulton, MD (US); Ryan Carr, Fulton, MD (US)

(73) Assignee: Enveil, Inc., Fulton, MD (US)

( * ) Notice: Subject to any disclaimer, the term of this patent is extended or adjusted under 35 U.S.C. 154(b) by 1005 days.

(21) Appl. No.: 16/158,230

(22) Filed: Oct. 11, 2018

(65) Prior Publication Data

US 2019/0042786 A1 Feb. 7, 2019

Related U.S. Application Data

(63) Continuation-in-part of application No. 15/875,914, filed on Jan. 19, 2018, now Pat. No. 10,903,976.
(Continued)

(51) Int. Cl.
*H04L 29/00* (2006.01)
*G06F 21/62* (2013.01)
(Continued)

(52) U.S. Cl.
CPC .......... *G06F 21/6227* (2013.01); *H04L 9/008* (2013.01); *H04L 9/0894* (2013.01)

(58) Field of Classification Search
CPC .... G06F 21/6227; H04L 9/008; H04L 9/0894
(Continued)

(56) References Cited

U.S. PATENT DOCUMENTS 5,732,390 A   3/1998 Katayanagi et al.
6,178,435 B1  1/2001 Schmookler
(Continued)

FOREIGN PATENT DOCUMENTS

EP   2887607 A1 *  6/2015  ............. H04W 4/60
EP   2887607 A1    6/2015
(Continued)

OTHER PUBLICATIONS

Panda et al., "FPGA Prototype of Low Latency BBS PRNG," IEEE International Symposium on Nanoelectronic and Information Systems, Dec. 2015, pp. 118-123, 7 pages.
(Continued)

*Primary Examiner* — Brandon Hoffman
*Assistant Examiner* — Michael D Anderson
(74) *Attorney, Agent, or Firm* — Carr & Ferrell LLP

(57) ABSTRACT

Provided are methods and systems for query processing with adaptive risk decisioning. An example method includes receiving a query by a client in communication with plurality of servers. The method further includes analyzing, by the client, the query to select at least one server being configured to provide data of a data source, the data being associated with a portion of the query. The method includes acquiring, by the client, a security profile of the data source. The method includes generating, by the client and based on the query, at least one subquery for the server. The method includes sending, by the client, the subquery to the server. The server processes, based on the security profile, the subquery over the data, to obtain a result of the subquery. The method includes generating, by the client and based on the result of the subquery, a result for the query.

20 Claims, 5 Drawing Sheets

Related U.S. Application Data

(60) Provisional application No. 62/448,890, filed on Jan. 20, 2017, provisional application No. 62/448,918, filed on Jan. 20, 2017, provisional application No. 62/448,893, filed on Jan. 20, 2017, provisional application No. 62/448,906, filed on Jan. 20, 2017, provisional application No. 62/448,908, filed on Jan. 20, 2017, provisional application No. 62/448,913, filed on Jan. 20, 2017, provisional application No. 62/448,916, filed on Jan. 20, 2017, provisional application No. 62/448,883, filed on Jan. 20, 2017, provisional application No. 62/448,885, filed on Jan. 20, 2017, provisional application No. 62/448,902, filed on Jan. 20, 2017, provisional application No. 62/448,896, filed on Jan. 20, 2017, provisional application No. 62/448,899, filed on Jan. 20, 2017, provisional application No. 62/462,818, filed on Feb. 23, 2017.

(51) Int. Cl.
*H04L 9/00* (2022.01)
*H04L 9/08* (2006.01)

(58) Field of Classification Search
USPC .......................................................... 713/189
See application file for complete search history.

(56) References Cited

U.S. PATENT DOCUMENTS

| | | | |
|---|---|---|---|
| 6,745,220 B1 | 6/2004 | Hars | |
| 6,748,412 B2 | 6/2004 | Ruehle | |
| 6,910,059 B2 | 6/2005 | Lu et al. | |
| 7,712,143 B2 | 5/2010 | Comlekoglu | |
| 7,849,185 B1* | 12/2010 | Rockwood | H04L 63/14 709/224 |
| 7,870,398 B2* | 1/2011 | Perng | G06F 16/20 713/193 |
| 7,937,270 B2 | 5/2011 | Smaragdis et al. | |
| 8,515,058 B1 | 8/2013 | Gentry | |
| 8,565,435 B2 | 10/2013 | Gentry et al. | |
| 8,781,967 B2 | 7/2014 | Tehranchi et al. | |
| 8,832,465 B2 | 9/2014 | Gulati et al. | |
| 9,059,855 B2 | 6/2015 | Johnson et al. | |
| 9,094,378 B1 | 7/2015 | Yung et al. | |
| 9,189,411 B2 | 11/2015 | Mckeen et al. | |
| 9,215,219 B1 | 12/2015 | Krendelev et al. | |
| 9,288,039 B1 | 3/2016 | Monet et al. | |
| 9,491,111 B1 | 11/2016 | Roth et al. | |
| 9,503,432 B2 | 11/2016 | El Emam et al. | |
| 9,514,317 B2 | 12/2016 | Martin et al. | |
| 9,565,020 B1 | 2/2017 | Camenisch et al. | |
| 9,577,829 B1 | 2/2017 | Roth et al. | |
| 9,652,609 B2 | 5/2017 | Kang et al. | |
| 9,846,787 B2 | 12/2017 | Johnson et al. | |
| 9,852,306 B2 | 12/2017 | Cash et al. | |
| 9,942,032 B1 | 4/2018 | Kornaropoulos et al. | |
| 9,946,810 B1 | 4/2018 | Trepetin et al. | |
| 9,973,334 B2 | 5/2018 | Hibshoosh et al. | |
| 10,027,486 B2 | 7/2018 | Liu | |
| 10,055,602 B2 | 8/2018 | Deshpande et al. | |
| 10,073,981 B2 | 9/2018 | Arasu et al. | |
| 10,075,288 B1 | 9/2018 | Khedr et al. | |
| 10,120,893 B1 | 11/2018 | Rocamora et al. | |
| 10,129,028 B2 | 11/2018 | Kamakari et al. | |
| 10,148,438 B2 | 12/2018 | Evancich et al. | |
| 10,181,049 B1 | 1/2019 | El Defrawy et al. | |
| 10,210,266 B2 | 2/2019 | Antonopoulos et al. | |
| 10,235,539 B2 | 3/2019 | Ito et al. | |
| 10,255,454 B2 | 4/2019 | Kamara et al. | |
| 10,333,715 B2 | 6/2019 | Chu et al. | |
| 10,375,042 B2 | 8/2019 | Chaum | |
| 10,396,984 B2 | 8/2019 | French et al. | |
| 10,423,806 B2 | 9/2019 | Cerezo Sanchez | |
| 10,489,604 B2 | 11/2019 | Yoshino et al. | |
| 10,496,631 B2 | 12/2019 | Tschudin et al. | |
| 10,644,876 B2 | 5/2020 | Williams et al. | |
| 10,693,627 B2 | 6/2020 | Carr | |
| 10,721,057 B2 | 7/2020 | Carr | |
| 10,728,018 B2 | 7/2020 | Williams et al. | |
| 10,771,237 B2 | 9/2020 | Williams et al. | |
| 10,790,960 B2 | 9/2020 | Williams et al. | |
| 10,817,262 B2 | 10/2020 | Carr et al. | |
| 10,873,568 B2 | 12/2020 | Williams | |
| 10,880,275 B2 | 12/2020 | Williams | |
| 10,902,133 B2 | 1/2021 | Williams et al. | |
| 10,903,976 B2 | 1/2021 | Williams et al. | |
| 10,972,251 B2 | 4/2021 | Carr | |
| 11,196,540 B2 | 12/2021 | Williams et al. | |
| 11,196,541 B2 | 12/2021 | Williams et al. | |
| 11,290,252 B2 | 3/2022 | Carr | |
| 11,451,370 | 9/2022 | Williams et al. | |
| 2002/0032712 A1 | 3/2002 | Miyasaka et al. | |
| 2002/0073316 A1 | 6/2002 | Collins et al. | |
| 2002/0104002 A1 | 8/2002 | Nishizawa et al. | |
| 2003/0037087 A1 | 2/2003 | Rarick | |
| 2003/0059041 A1 | 3/2003 | MacKenzie et al. | |
| 2003/0110388 A1 | 6/2003 | Pavlin et al. | |
| 2004/0167952 A1 | 8/2004 | Gueron et al. | |
| 2005/0008152 A1 | 1/2005 | MacKenzie | |
| 2005/0076024 A1 | 4/2005 | Takatsuka et al. | |
| 2005/0259817 A1 | 11/2005 | Ramzan et al. | |
| 2006/0008080 A1 | 1/2006 | Higashi et al. | |
| 2006/0008081 A1 | 1/2006 | Higashi et al. | |
| 2007/0053507 A1 | 3/2007 | Smaragdis et al. | |
| 2007/0095909 A1 | 5/2007 | Chaum | |
| 2007/0140479 A1 | 6/2007 | Wang et al. | |
| 2007/0143280 A1 | 6/2007 | Wang et al. | |
| 2009/0037504 A1 | 2/2009 | Hussain | |
| 2009/0083546 A1 | 3/2009 | Staddon et al. | |
| 2009/0193033 A1 | 7/2009 | Ramzan et al. | |
| 2009/0268908 A1 | 10/2009 | Bikel et al. | |
| 2009/0279694 A1 | 11/2009 | Takahashi et al. | |
| 2009/0287837 A1 | 11/2009 | Felsher | |
| 2010/0202606 A1 | 8/2010 | Almeida | |
| 2010/0205430 A1 | 8/2010 | Chiou et al. | |
| 2010/0241595 A1 | 9/2010 | Felsher | |
| 2011/0026781 A1 | 2/2011 | Osadchy et al. | |
| 2011/0107105 A1 | 5/2011 | Hada | |
| 2011/0110525 A1 | 5/2011 | Gentry | |
| 2011/0243320 A1 | 10/2011 | Halevi et al. | |
| 2011/0283099 A1 | 11/2011 | Nath et al. | |
| 2012/0039469 A1 | 2/2012 | Mueller et al. | |
| 2012/0054485 A1 | 3/2012 | Tanaka et al. | |
| 2012/0066510 A1 | 3/2012 | Weinman | |
| 2012/0201378 A1 | 8/2012 | Nabeel et al. | |
| 2012/0265794 A1 | 10/2012 | Niel | |
| 2012/0265797 A1 | 10/2012 | Niel | |
| 2013/0010950 A1 | 1/2013 | Kerschbaum | |
| 2013/0051551 A1 | 2/2013 | El Aimani | |
| 2013/0054665 A1 | 2/2013 | Felch | |
| 2013/0114811 A1 | 5/2013 | Boufounos et al. | |
| 2013/0148868 A1 | 6/2013 | Troncoso Pastoriza et al. | |
| 2013/0170640 A1 | 7/2013 | Gentry | |
| 2013/0191650 A1* | 7/2013 | Balakrishnan | G06F 21/6227 713/190 |
| 2013/0195267 A1 | 8/2013 | Alessio et al. | |
| 2013/0198526 A1 | 8/2013 | Goto | |
| 2013/0216044 A1 | 8/2013 | Gentry et al. | |
| 2013/0230168 A1 | 9/2013 | Takenouchi | |
| 2013/0237242 A1 | 9/2013 | Oka et al. | |
| 2013/0246813 A1 | 9/2013 | Mori et al. | |
| 2013/0326224 A1 | 12/2013 | Yavuz | |
| 2013/0339722 A1 | 12/2013 | Krendelev et al. | |
| 2013/0339751 A1 | 12/2013 | Sun et al. | |
| 2013/0346741 A1 | 12/2013 | Kim et al. | |
| 2013/0346755 A1 | 12/2013 | Nguyen et al. | |
| 2014/0164758 A1 | 6/2014 | Ramamurthy et al. | |
| 2014/0189811 A1 | 7/2014 | Taylor et al. | |
| 2014/0233727 A1 | 8/2014 | Rohloff et al. | |
| 2014/0281511 A1 | 9/2014 | Kaushik et al. | |
| 2014/0355756 A1 | 12/2014 | Iwamura et al. | |

(56) References Cited

U.S. PATENT DOCUMENTS

| | | |
|---|---|---|
| 2015/0100785 A1 | 4/2015 | Joye et al. |
| 2015/0100794 A1 | 4/2015 | Joye et al. |
| 2015/0205967 A1 | 7/2015 | Naedele et al. |
| 2015/0215123 A1 | 7/2015 | Kipnis et al. |
| 2015/0227930 A1 | 8/2015 | Quigley et al. |
| 2015/0229480 A1 | 8/2015 | Joye et al. |
| 2015/0244517 A1 | 8/2015 | Nita |
| 2015/0248458 A1 | 9/2015 | Sakamoto |
| 2015/0304736 A1 | 10/2015 | Lal et al. |
| 2015/0358152 A1 | 12/2015 | Ikarashi et al. |
| 2015/0358153 A1 | 12/2015 | Gentry |
| 2016/0004874 A1 | 1/2016 | Ioannidis et al. |
| 2016/0036826 A1 | 2/2016 | Pogorelik et al. |
| 2016/0072623 A1 | 3/2016 | Joye et al. |
| 2016/0105402 A1 | 4/2016 | Kupwade-Patil et al. |
| 2016/0105414 A1 | 4/2016 | Bringer et al. |
| 2016/0119346 A1 | 4/2016 | Chen et al. |
| 2016/0140348 A1 | 5/2016 | Nawaz et al. |
| 2016/0179945 A1 | 6/2016 | Lastra Diaz et al. |
| 2016/0182222 A1 | 6/2016 | Rane et al. |
| 2016/0323098 A1 | 11/2016 | Bathen |
| 2016/0335450 A1 | 11/2016 | Yoshino et al. |
| 2016/0344557 A1 | 11/2016 | Chabanne et al. |
| 2016/0350648 A1 | 12/2016 | Gilad-Bachrach et al. |
| 2017/0070340 A1 | 3/2017 | Hibshoosh et al. |
| 2017/0070351 A1 | 3/2017 | Yan |
| 2017/0099133 A1 | 4/2017 | Gu et al. |
| 2017/0134158 A1 | 5/2017 | Pasol et al. |
| 2017/0185776 A1 | 6/2017 | Robinson et al. |
| 2017/0264426 A1 | 9/2017 | Joye et al. |
| 2017/0366562 A1 | 12/2017 | Zhang et al. |
| 2018/0091466 A1 | 3/2018 | Friedman et al. |
| 2018/0139054 A1 | 5/2018 | Chu et al. |
| 2018/0198601 A1 | 7/2018 | Laine et al. |
| 2018/0204284 A1 | 7/2018 | Cerezo Sanchez |
| 2018/0212751 A1 | 7/2018 | Williams et al. |
| 2018/0212752 A1 | 7/2018 | Williams et al. |
| 2018/0212753 A1 | 7/2018 | Williams |
| 2018/0212754 A1 | 7/2018 | Williams et al. |
| 2018/0212755 A1 | 7/2018 | Williams et al. |
| 2018/0212756 A1 | 7/2018 | Carr |
| 2018/0212757 A1 | 7/2018 | Carr |
| 2018/0212758 A1 | 7/2018 | Williams et al. |
| 2018/0212759 A1 | 7/2018 | Williams et al. |
| 2018/0212775 A1 | 7/2018 | Williams |
| 2018/0212933 A1 | 7/2018 | Williams |
| 2018/0224882 A1 | 8/2018 | Carr |
| 2018/0234254 A1 | 8/2018 | Camenisch et al. |
| 2018/0267981 A1 | 9/2018 | Sirdey et al. |
| 2018/0270046 A1 | 9/2018 | Carr |
| 2018/0276417 A1 | 9/2018 | Cerezo Sanchez |
| 2018/0343109 A1 | 11/2018 | Koseki et al. |
| 2018/0349632 A1 | 12/2018 | Bent et al. |
| 2018/0359097 A1 | 12/2018 | Lindell |
| 2018/0373882 A1 | 12/2018 | Veugen |
| 2019/0013950 A1 | 1/2019 | Becker et al. |
| 2019/0108350 A1 | 4/2019 | Bohli et al. |
| 2019/0158272 A1 | 5/2019 | Chopra et al. |
| 2019/0229887 A1 | 7/2019 | Ding et al. |
| 2019/0238311 A1 | 8/2019 | Zheng |
| 2019/0251553 A1 | 8/2019 | Ma et al. |
| 2019/0251554 A1 | 8/2019 | Ma et al. |
| 2019/0253235 A1 | 8/2019 | Zhang et al. |
| 2019/0260585 A1 | 8/2019 | Kawai et al. |
| 2019/0266282 A1 | 8/2019 | Mitchell et al. |
| 2019/0280880 A1 | 9/2019 | Zhang et al. |
| 2019/0312728 A1 | 10/2019 | Poeppelmann |
| 2019/0327078 A1 | 10/2019 | Zhang et al. |
| 2019/0334716 A1 | 10/2019 | Kocsis et al. |
| 2019/0349191 A1 | 11/2019 | Soriente et al. |
| 2019/0371106 A1 | 12/2019 | Kaye |
| 2020/0134200 A1 | 4/2020 | Williams et al. |
| 2020/0150930 A1 | 5/2020 | Carr et al. |
| 2020/0204341 A1 | 6/2020 | Williams et al. |
| 2020/0382274 A1 | 12/2020 | Williams et al. |
| 2020/0396053 A1 | 12/2020 | Williams et al. |
| 2021/0034765 A1 | 2/2021 | Williams et al. |
| 2021/0105256 A1 | 4/2021 | Williams |
| 2021/0409191 A1 | 12/2021 | Williams et al. |
| 2022/0006629 A1 | 1/2022 | Williams et al. |
| 2022/0116200 A1 | 4/2022 | Carr |

FOREIGN PATENT DOCUMENTS

| | | |
|---|---|---|
| EP | 2873186 B1 | 3/2018 |
| JP | 5680007 B2 | 3/2015 |
| KR | 101386294 B1 | 4/2014 |
| WO | WO2014105160 A1 | 7/2014 |
| WO | WO2015094261 A1 | 6/2015 |
| WO | WO2016003833 A1 | 1/2016 |
| WO | WO2016018502 A1 | 2/2016 |
| WO | WO2018091084 A1 | 5/2018 |
| WO | WO2018136801 A1 | 7/2018 |
| WO | WO2018136804 A1 | 7/2018 |
| WO | WO2018136811 A1 | 7/2018 |

OTHER PUBLICATIONS

Sahu et al., "Implementation of Modular Multiplication for RSA Algorithm," 2011 International Conference on Communication Systems and Network Technologies, 2011, pp. 112-114, 3 pages.

Drucker et al., "Achieving trustworthy Homomorphic Encryption by combining it with a Trusted Execution Environment," Journal of Wireless Mobile Networks, Ubiquitous Computing, and Dependable Application (JoWUA), Mar. 2018, pp. 86-99.

Google Scholar, search results for "trusted execution environment database", 2 pages, Aug. 1, 2020.

PIRK Code Excerpt—QuerierDriver, https://github.com/apache/incubator-retired-pirk/blob/master/src/main/java/org/apache/pirk/querier/wideskies/QuerierDriver.java; Jul. 11, 2016; 5 pages.

PIRK Code Excerpt—QuerierDriverCLI, https://github.com/apache/incubator-retired-pirk/blob/master/src/main/java/org/apache/pirk/querier/wideskies/QuerierCLI.java; Jul. 11, 2016; 9 pages.

PIRK Code Excerpt—Query; [online]; Retreived from the Internet: <URL: https://github.com/apache/incubator-retired-pirk/blob/master/src/main/java/org/apache/pirk/query/wideskies/Query.java>; Jul. 11, 2016; 7 pages.

PIRK Code Excerpt—Queryinfo; [online]; Retreived from the Internet: <URL: https://github.com/apache/incubator-retired-pirk/blob/master/src/main/java/org/apache/pirk/query/wideskies/QueryInfo.java>; Jul. 11, 2016; 4 pages.

PIRK Code Excerpt—ComputeResponse; [online]; Retreived from the Internet: <URL: https://github.com/apache/incubator-retired-pirk/blob/master/src/main/java/org/apache/pirk/responder/wideskies/spark/ComputeResponse.java> Jul. 11, 2016; 8 pages.

PIRK Code Excerpt—HashSelectorsAndPartitionData; [online]; Retreived from the Internet: <URL: https://github.com/apache/incubator-retired-pirk/blob/master/src/main/java/org/apache/pirk/responder/wideskies/spark/HashSelectorsAndPartitionData.java>; Jul. 11, 2016; 2 pages.

PIRK Code Excerpt—HashSelectorsAndFormPartitionsBigInteger; [online]; Retreived from the Internet: <URL: https://github.com/apache/incubator-retired-pirk/blob/master/src/main/java/org/apache/pirk/responder/wideskies/common/HashSelectorAndPartitionData.java>; Jul. 11, 2016; 3 pages.

PIRK Code Excerpt—QueryUtils; [online]; Retreived from the Internet: <URL: https://github.com/apache/incubator-retired-pirk/blob/master/src/main/java/org/apache/pirk/query/wideskies/QueryUtils.java>; Jul. 11, 2016; 8 pages.

PIRK Code Excerpt—QuerySchema; [online]; Retreived from the Internet: <URL: https://github.com/apache/incubator-retired-pirk/blob/master/src/main/java/org/apache/pirk/schema/query/QuerySchema.java>; Jul. 11, 2016; 3 pages.

"PIRK Proposal" Apache.org [online], [retreived on Oct. 28, 20]; Retreived from the Internet: <URL:https://cwiki.apache.org/confluence/display/incubator/PirkProposal>; Apr. 10, 2019; 5 pages.

(56) References Cited

OTHER PUBLICATIONS

Bosch et al., "SOFIR: Securely Outsourced Forensic Recognition," 2014 IEEE International Conference on Acoustic, Speech and Signal Processing (ICASSP), IEEE 978-1-4799-2893-4/14, 2014, pp. 2713-2717.
Waziri et al., "Big Data Analytics and Data Security in the Cloud via Fullly Homomorphic Encryption," World Academy of Science, Engineering and Technology International Journal of Computer, Electrical, Automation, Control and Information Engineering, vol. 9, No. 3, 2015, pp. 744-753.
Bajpai et al., "A Fully Homomorphic Encryption Implementation on Cloud Computing," International Journal of Information & Computation Technology, ISSN 0974-2239 vol. 4, No. 8, 2014, pp. 811-816.
Viejo et al., "Asymmetric homomorphisms for secure aggregation in heterogeneous scenarios," Information Fusion 13, Elsevier B.V., Mar. 21, 2011, pp. 285-295.
Patil et al, "Big Data Privacy Using Fully Homomorphic Non-Deterministic Encryption," IEEE 7th International Advance Computing Conference, Jan. 5-7, 2017, 15 pages.
Petition to Insitute Derivation Proceeding Pursuant to 35 USC 135; Case No. DER2019-00009, US Patent and Trademark Office Patent Trial and Appeal Board; Jul. 26, 2019, 272 pages. (2 PDFs).
SCAMP Working Paper L29/11, "A Woods Hole Proposal Using Striping," Dec. 2011, 14 pages.
O'Hara, Michael James, "Shovel-ready Private Information Retrieval," Dec. 2015, 4 pages.
Carr, Benjamin et al., "Proposed Laughing Owl," NSA Technical Report, Jan. 5, 2016, 18 pages.
Williams, Ellison Anne et al., "Wideskies: Scalable Private Informaton Retrieval," 14 pages.
Carr, Benjamin et al., "A Private Stream Search Technique," NSA Technical Report, Dec. 1, 2015, 18 pages.
Drucker et al., "Paillier-encrypted databases with fast aggregated queries," 2017 14th IEEE Annual Consumer Communications & Networking Conference (CCNC), Jan. 8-11, 2017, pp. 848-853.
Tu et al., "Processing Analytical Queries over Encrypted Data," Proceedings of the VLDB Endowment, vol. 6, Issue No. 5, Mar. 13, 2013. pp. 289-300.
Boneh et al., "Private Database Queries Using Somewhat Homomorphic Encryption", Cryptology ePrint Archive: Report 2013/422, Standford University [online], Jun. 27, 2013, [retrieved on Dec. 9, 2019], 22 pages.
Chen et al., "Efficient Multi-Key Homomorphic Encryption with Packed Ciphertexts with Application to Oblivious Neural Network Inference", CCS '19 Proceedings of the 2019 ACM SIGSAC Conference on Computer and Communications Security, May 19, 2019. pp. 395-412.
Armknecht et al., "A Guide to Fully Homomorphic Encryption" IACR Cryptology ePrint Archive: Report 2015/1192 [online], Dec. 14, 2015, 35 pages.
Bayar et al., "A Deep Learning Approach to Universal Image Manipulation Detection Using a New Convolutional Layer", IH&MMSec 2016, Jun. 20-22, 2016. pp. 5-10.
Juvekar et al. "Gazelle: A Low Latency Framework for Secure Neural Network Inference", 27th USENIX Security Symposium, Aug. 15-17, 2018. pp. 1650-1668.
"International Search Report" and "Written Opinion of the International Searching Authority," Patent Cooperation Treaty Application No. PCT/US2018/014535, dated Apr. 19, 2018, 9 pages.
"International Search Report" and "Written Opinion of the International Searching Authority," Patent Cooperation Treaty Application No. PCT/US2018/014530, dated Apr. 23, 2018, 7 pages.
"International Search Report" and "Written Opinion of the International Searching Authority," Patent Cooperation Treaty Application No. PCT/US2018/014551, dated Apr. 24, 2018, 8 pages.
Fan et al., "Somewhat Practical Fully Homomorphic Encryption", IACR Cryptol. ePrintArch. 2012, 19 pages.
"Microsoft Computer Dictionary", pp. 276 and 529, Microsoft Press, 5th Edition, ISBN 0735614954,2002, (Year: 2002), 4 pages.
"Homomorphic encryption", Wikipedia, May 22, 2021, pages.

* cited by examiner

| Security Level | Subquery | Data read to process the subquery |
|---|---|---|
| 1 | Unencrypted | Unencrypted |
| 2 | Encrypted/TEE-Decrypted | Unencrypted |
| 3 | Encrypted/TEE-Decrypted | Encrypted |
| 4 | Encrypted/Never Decrypted | Unencrypted |
| 5 | Encrypted/Never Decrypted | Encrypted |

*FIG. 3*

QUERY PROCESSING WITH ADAPTIVE RISK DECISIONING

CROSS-REFERENCE TO RELATED APPLICATIONS

This application is a continuation-in-part of U.S. patent application Ser. No. 15/875,914, filed Jan. 19, 2018, which claims the benefit of U.S. Provisional Application No. 62/448,890, filed Jan. 20, 2017; U.S. Provisional Application No. 62/448,918, filed on Jan. 20, 2017; U.S. Provisional Application No. 62/448,893, filed on Jan. 20, 2017; U.S. Provisional Application No. 62/448,906, filed on Jan. 20, 2017; U.S. Provisional Application No. 62/448,908, filed on Jan. 20, 2017; U.S. Provisional Application No. 62/448,913, filed on Jan. 20, 2017; U.S. Provisional Application No. 62/448,916, filed on Jan. 20, 2017; U.S. Provisional Application No. 62/448,883, filed on Jan. 20, 2017; U.S. Provisional Application No. 62/448,885, filed on Jan. 20, 2017; U.S. Provisional Application No. 62/448,902, filed on Jan. 20, 2017; U.S. Provisional Application No. 62/448,896, filed on Jan. 20, 2017; U.S. Provisional Application No. 62/448,899, filed on Jan. 20, 2017; and U.S. Provisional Application No. 62/462,818, filed on Feb. 23, 2017, the disclosures of which are hereby incorporated by reference for all purposes.

TECHNICAL FIELD

This disclosure relates to the technical field of secure data processing. More specifically, this disclosure relates to systems and methods for query processing with adaptive risk decisioning.

BACKGROUND

With development of computer technologies, sensitive data, such as financial information and medical records can be kept on remote servers or cloud-based computing resources. Authorized users can access the sensitive data through applications running, for example, on their personal computing devices. Typically, personal computing devices are connected, via data networks, to servers or cloud-based computing resources. Therefore, messages sent over the data network can be subject to unauthorized access during the transmission as well as during processing on the remote servers or cloud-based computing resources.

Encryption techniques, such as homomorphic encryption, can be applied to the sensitive data and messages to prevent unauthorized access during the transmission over a network and processing in the data environment. Encryption and decryption may include specific algebraic operations performed on plaintext and/or ciphertext representing queries, data in data sources, and on responses to the queries. Performing the encryption and decryption may require additional time and computing resources of servers. The additional time may cause delays in processing of queries by the servers. Additionally, processing of queries may require accessing data from various data sources with different levels of security.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to the technology for secure data processing. Some embodiments of the present disclosure may facilitate processing queries requiring access to data from multiple data sources with different levels of security.

According to one example embodiment of the present disclosure, a method for query processing with adaptive risk decisioning is provided. An example method may include receiving a query by a client. The client can be in communication with a plurality of servers. The method may further include analyzing, by the client, the query to determine at least one server configured to provide data of at least one data source of a plurality of data sources, wherein the data are associated with a portion of the query. The server can be selected from the plurality of servers. The method may further include acquiring, by the client and/or the server, a security profile of the data source. The method may further include generating, by the client and based on the security profile, at least one subquery for the server. The method may further include sending the subquery to the server, wherein the server is configured to process, based on the security profile, the subquery over the data of the data source to obtain a result for the subquery. The method may further include generating, by the client and based on the result of the subquery, a result for the query.

The query may include plaintext. The method may further include storing profiles of the plurality of data sources, by the client and/or the server, to a database of security profiles. The method may further include providing, by the at least one client, a user interface to configure the security profiles of the plurality of data sources. The generating of the subquery based on the security profile may include keeping the subquery unencrypted. The server can be configured to execute the unencrypted subquery over unencrypted data.

In some example embodiments, the subquery can be encrypted, by the client, based on an encryption scheme to generate an encrypted subquery. The server can be configured to execute the encrypted subquery over unencrypted data. In other example embodiments, the subquery may be encrypted, by the client, with an encryption scheme to generate an encrypted subquery. The server can be configured to execute the encrypted subquery over encrypted data. The encryption scheme may include a homomorphic encryption.

The subquery may be encrypted, by the client, using an encryption scheme to generate an encrypted subquery. The server can be configured to decrypt, in a Trusted Execution Environment (TEE) and based on the encryption scheme, the encrypted subquery to obtain an unencrypted subquery. The server may further execute, in the TEE, the unencrypted subquery over unencrypted data to obtain an unencrypted result. The server may further encrypt, in the TEE and based on the encryption scheme, the unencrypted result to obtain an encrypted result of the subquery. The server may further send the encrypted result of the subquery to the client. The client can decrypt, based on the encryption scheme, the encrypted result of the subquery to obtain the result of the subquery The subquery may be encrypted, by the client, using an encryption scheme to generate an encrypted subquery. The server may be configured to decrypt, in the TEE and based on the encryption scheme, the encrypted subquery to obtain an unencrypted subquery and execute, in the TEE, the unencrypted subquery over encrypted data to obtain an encrypted result. The server may further encrypt, in the TEE and based on the encryption scheme, the encrypted result to obtain a doubly-encrypted result. The sever may further send the doubly-encrypted result to the client. The client may decrypt the doubly-encrypted result to obtain the result of the subquery.

According to one example embodiment of the present disclosure, a system for query processing with adaptive risk decisioning is provided. The system may include at least one processor and a memory storing processor-executable codes, wherein the at least one processor can be configured to implement the operations of the above-mentioned method for query processing with adaptive risk decisioning.

According to yet another example embodiment of the present disclosure, the operations of the above-mentioned method for query processing with adaptive risk decisioning are stored on a machine-readable medium comprising instructions, which when implemented by one or more processors perform the recited operations.

Other example embodiments of the disclosure and aspects will become apparent from the following description taken in conjunction with the following drawings.

BRIEF DESCRIPTION OF DRAWINGS

Exemplary embodiments are illustrated by way of example and not limitation in the figures of the accompanying drawings, in which like references indicate similar elements.

FIG. 3 is a table showing security levels for data sources, according to some example embodiments of the present disclosure.

DETAILED DESCRIPTION

Figure 1:
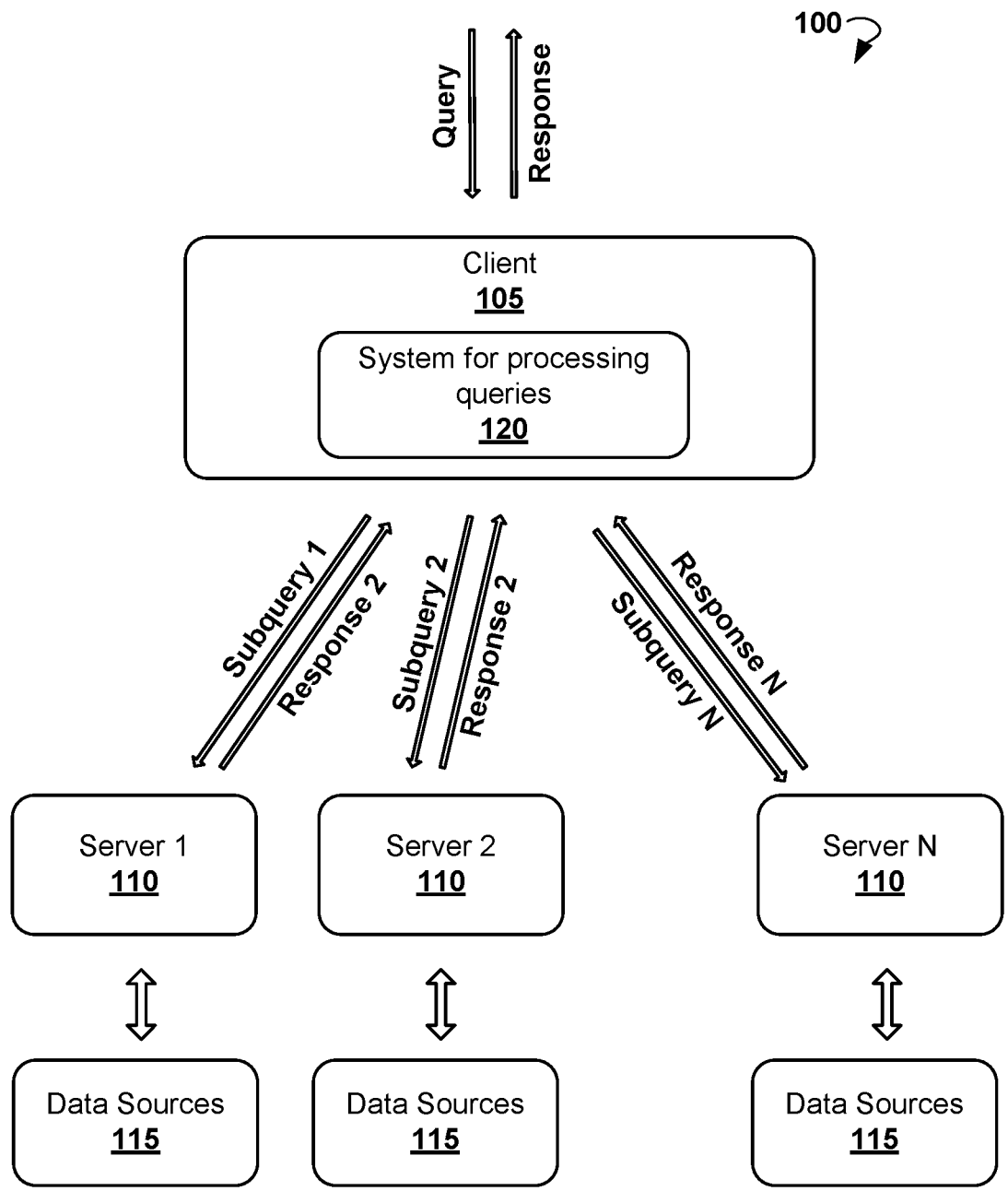
FIG. 1 is a block diagram of an example environment suitable for practicing methods for query processing with adaptive risk decisioning, according to some example embodiments.

The technology disclosed herein is concerned with methods and systems for query processing. Embodiments of the present disclosure may facilitate processing queries requiring reading data from multiple data sources with different levels of protections.

According to some embodiments of the present disclosure, a system for query processing with adaptive risk decisioning is provided. The system may allow a user to submit a query in a plaintext format. The query may involve data from a plurality of data sources. The system may analyze the query to determine search terms corresponding to the data sources and determine risk levels of accessing data from the data sources. The system may further generate, based on the query, subqueries to be run against each of the data sources with different level of protection for each data source.

Depending on the levels of protection, a subquery can be unencrypted and run against unencrypted data of a data source, the subquery can be encrypted and can be run against unencrypted data of the data source, or the subquery can be encrypted and run against encrypted data of the data source. Additionally, the encrypted subquery can be decrypted in a TEE and run against either unencrypted data or encrypted data of the data source.

The system may further combine results from the subqueries to generate the result of the original query. The result can be presented to the user in a plaintext format. The system may include a user interface to allow the user monitoring results of parsing of the query into subqueries and results of processing the subqueries. Results can be presented as several database tables containing unencrypted data.

According to one example embodiment of the present disclosure, a method for query processing with adaptive risk decisioning may commence with receiving a query by a client in communication with a plurality of servers. The method may further include analyzing, by the client, the query to determine at least one server configured to provide data associated with a portion of the query. The server can be selected from the plurality of servers. The method may also include acquiring, by the client and the server, a security profile of the data source. The method may also include generating, by the client and based on the query, at least one subquery for the data source. The method may include sending, by the client, the subquery to the server. The server can be configured to process, based on the security profile, the subquery over the data to obtain a result for the subquery. The method may further include generating, by the client and based on the result for the subquery, a result for the query.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 shows a block diagram of an example environment 100 suitable for practicing the methods described herein. It should be noted, however, that the environment 100 is just one example and is a simplified embodiment provided for illustrative purposes, and reasonable deviations of this embodiment are possible as will be evident for those skilled in the art.

As shown in FIG. 1, the environment 100 may include at least one client device 105 (also referred to as client 105), one or more servers 110, and data sources 115. The client 105 can include any appropriate computing device having network functionalities allowing the device to communicate to servers 110. In some embodiments, the client 105 can be connected to the servers 110 via one or more wired or wireless communications networks. In various embodiments, the client 105 includes, but is not limited to, a computer (e.g., laptop computer, tablet computer, desktop computer), a server, cellular phone, smart phone, gaming console, multimedia system, smart television device, set-top box, infotainment system, in-vehicle computing device, informational kiosk, smart home computer, software application, computer operating system, modem, router, and so forth. In some embodiments, the client 105 can be used by users to receive an authorized access to the servers 110 and configure the servers to process queries for data provided by data sources 115.

In various embodiments, the servers 110 may include a standalone server or cloud-based computing resource(s). The cloud-based computing resource(s) can include hardware and software available at a remote location and accessible over a network (for example, the Internet). The cloud-based computing resource(s) can be dynamically re-allocated based on demand. The cloud-based computing resources may include one or more server farms/clusters including a collection of computer servers which can be co-located with network switches and/or routers.

In some example embodiments, the client 105 may include a system 120 for processing queries. The system 120 can be configured to acquire queries. The queries can be either entered by a user of the client 105 or received from another application running on the client 105 or a computer device in communication with the client. The system 120 may further process the queries to generate subqueries. Each subquery can be further sent to one of the servers 110 configured to provide data from one or more data source from the data sources 115. The servers 110 may further process the subqueries using the data sources 115 to obtain results of the subqueries and send the results of subqueries to the client 105. The system 120 may further generate results of the queries based on the results of the subqueries.

In various embodiments, the data sources 115 may include one or more servers or cloud-based computing resource(s) configured to store data. The data sources 115 can be connected to the server 110 via one or more wired or wireless communications networks. The servers 110 can be configured to read the data from the data sources 115 to process subqueries received from the client 105. In some embodiments, the servers 110 can be also configured to store the data from the data sources 115.

The data associated with the data sources 115 may include plaintext data, deterministically encrypted data, semantically encrypted data, or a combination of thereof. The data associated with the data sources 115 can be encrypted or unencrypted based on the sensitivity of the data. For example, a first data source of the data sources 115 may include personal information of clients and should be kept encrypted. A second data source of the data sources 115 may include information concerning transactions carried out by the clients and may be kept unencrypted. A third data source from the data source 115 may include financial information of clients, such as credit cards and/or bank account data, which should be encrypted.

The data in some data sources 115 and corresponding subqueries can be encrypted using a homomorphic encryption (HE) based scheme. A homomorphic encryption is a form of encryption in which a specific algebraic operation (addition or multiplication) performed on plaintext, is equivalent to another operation performed on ciphertext. For example, in Partially Homomorphic Encryption (PHE) schemes, multiplication in ciphertext is equal to addition of the same values in plaintext.

For example, the homomorphic encryption scheme may include a Pallier cryptosystem. A subquery can be encrypted, by the client 105, with a public (encryption) key of the Pallier cryptosystem. The subquery and the public key can be sent to the server(s) 110 or data source 115. The encrypted subquery can be only decrypted with a private (decryption) key of the Pallier cryptosystem. The decryption key can be kept on the client and never provided to the server 110 or the data source 115.

To protect the content of the results of the subquery, the data of the data source 115 can be encrypted using the same homomorphic encryption scheme and public key received from the client 105. The server 110 can be further configured to perform the encrypted subquery on the encrypted data source and, thereby, obtain encrypted result of the subquery. The encrypted result can be sent to the client 105. The client 105 can decrypt the encrypted result using the private key. Because the private key is always kept on the client 105, neither encrypted subquery nor encrypted result of the subquery can be decrypted on the server 110 and/or data source 115 or when intercepted while in transition between the server 110 and the data source 115.

Figure 2:
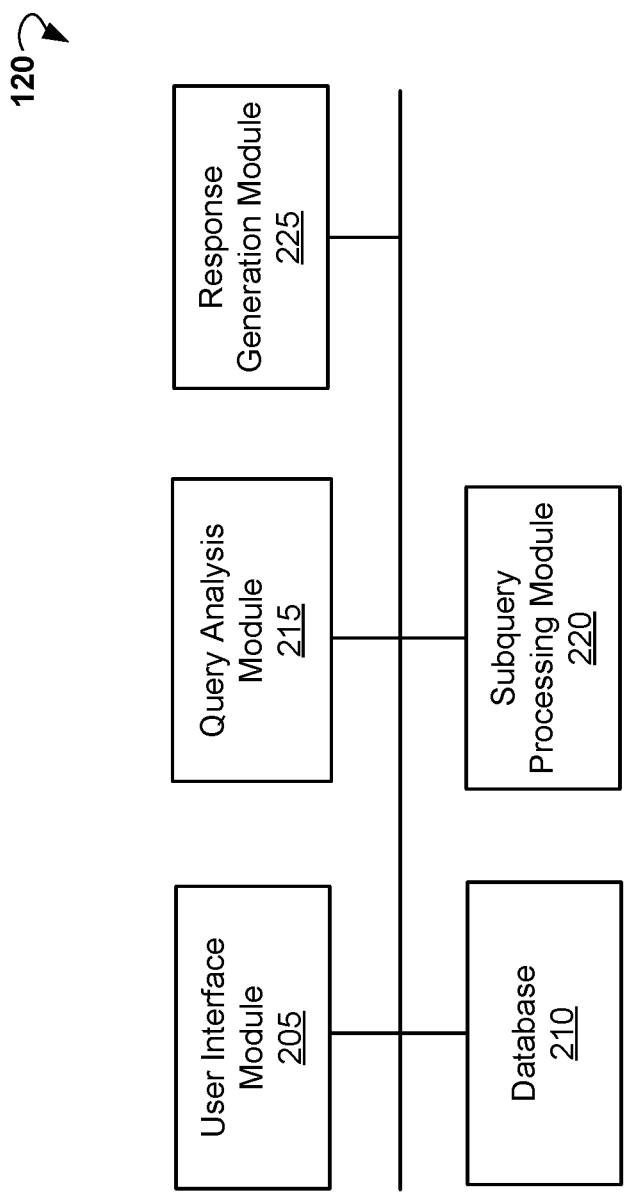
FIG. 2 is a block diagram showing an example system for query processing with adaptive risk decisioning, according to an example embodiment of the present disclosure.

FIG. 2 is a block diagram showing an example system 120 for query processing with adaptive risk decisioning, according to an example embodiment of the present disclosure. The system 120 may include a user interface module 205, a database 210, a query analysis module 215, subquery processing module 220, and a response generation module 225. The modules of the system 120 can be implemented as instructions stored in memory of the client 105 to be executed by one or more processors of the client 105.

The user interface module 205 may be configured to allow a user to specify a query to be performed on one or more data sources 115. The query can be entered by the user in a plaintext format. The user interface module 205 can also display a result of processing of the query. The user interface module 205 can also allow an authorized user (an administrator) to configure parameters of security profiles for processing subqueries for the data sources 115. The database 210 can be configured to store the security profiles for processing subqueries for the servers 110 and data sources 115. The security profiles may include security levels assigned to the servers 110 and the data sources 115. A security level may depend on the sensitivity of the data provided by servers 110 and the data sources 115. The security levels can indicate client 105 and servers 110 how to process the subqueries over the data in data sources 115.

FIG. 3 is a table 300 showing security levels for the data sources, according to some embodiments of the present disclosure. According to security level 1, the processing of queries may include keeping the subquery unencrypted and reading, by the server 110, unencrypted data in the data source 115. The unencrypted query can be sent from the client 105 to the server 110 over a network and an unencrypted result of the subquery can be sent from the server 110 to the client 105. The security level 1 can be used for data sources containing non-sensitive data that can be kept in the public domain.

According to security level 2, the subquery is encrypted by the client 105, using, an encryption scheme. The encryption scheme may include, for example, a HE-based scheme. The encrypted subquery can be further decrypted, by the server 110 and using the encryption scheme, in a Trusted Execution Environment (TEE) to be processed over data of the data source 115. The data of the data source 115 are unencrypted. The server 110 can process, in the TEE, the decrypted subquery over the unencrypted data of the data source 115 to obtain an unencrypted result for the subquery. The server 110 may further encrypt, in the TEE and using a public key of the encryption scheme, the unencrypted result of the subquery to obtain an encrypted result of subquery. The server 110 may further send the encrypted result of the subquery to the client 105. The client 105 may further decrypt, using a private key of the encryption scheme, the encrypted result of the subquery to obtain a decrypted result of the subquery.

According to security level 3, the subquery is encrypted by client 105, using a first encryption scheme. The first encryption scheme may include a first HE-based scheme. The encrypted subquery can be further decrypted, by the server 110 using the first encryption scheme, in the TEE and processed over data of the data source 115. The data of the data source 115 can be encrypted using a second encryption scheme. The second encryption scheme can be different from the first encryption scheme. The second encryption scheme can include a second HE-based scheme. The second HE-based scheme can be different from the first HE-based scheme. The server 110 can process the decrypted subquery over the encrypted data of the data source 115 to obtain an encrypted result for subquery. The encrypted result of the subquery is encrypted using the second encryption scheme. The server 110 may further encrypt, in the TEE and based on the first encryption scheme, the encrypted result of the subquery to obtain a doubly-encrypted result of the subquery. The server 110 may further send the doubly-encrypted result of the subquery to the client 105. The doubly-encrypted result can be decrypted only by the client 105. The doubly-encrypted result can be further decrypted, by the client 105, using a private key of the first encryption scheme to obtain an encrypted result of the subquery. The encrypted result of the subquery can be further decrypted, by the client 105, using a private key of the second encryption scheme.

According to security level 4, the subquery is encrypted by client 105, using an encryption scheme. The encryption scheme may include, for example, a homomorphic encryption (HE)-based scheme. The data in the data source 115 can be kept unencrypted. The encrypted subquery can be sent to the server 110 configured to read data from data source 115. The encrypted subquery can be never decrypted by the server 110 or the data source 115. The data of the data source 115 can remain unencrypted. The server 110 can process the encrypted subquery over unencrypted data of data source 115 to obtain an encrypted result for the subquery and send the encrypted result for the subquery to the client 105. The encrypted result is decrypted with the public key of the encryption scheme used by the client 105 to encrypt the subquery. The encrypted result of the subquery can be decrypted only by the client 105 using a private key of the encryption scheme.

According to security level 5, the subquery can be encrypted, using a first encryption scheme. The first encryption scheme may include, for example, a first HE-based scheme. The data in the data source 115 can be encrypted using a second encryption scheme. The second encryption scheme can be different from the first encryption scheme. The second encryption scheme may include a second HE-based scheme which is different from the first HE-based scheme. The encrypted subquery can be sent to the server 110 configured to read data from the data source 115. The data are encrypted with a public key of the second encryption scheme. The server 110 may further process the encrypted subquery over the encrypted data of the data source 115 to obtain a doubly-encrypted result for subquery. The server 110 may further send the doubly-encrypted result of the subquery to the client 105. The doubly-encrypted result can be decrypted by the client 105 only. The doubly-encrypted result can be further decrypted, by the client 105, using a private key of the first encryption scheme to obtain an encrypted result of the subquery. The encrypted result of the subquery can be further decrypted, by the client 105, using a private key of the second encryption scheme.

Referring back to FIG. 2, the query analysis module 215 can be configured to analyze the query and determine which of the data sources 115 are required to be read for the query and search terms for each of the data source 115. The query analysis module 215 can further generate subqueries for the data sources 115. The query analysis module 215 can read the security profiles of the servers 110 and the data sources 115. The query analysis module 215 can determine, based on the security profiles, which of the subqueries are required to be encrypted. In some embodiments, the query analysis module 215 may specify an order in which the subqueries are to be processed. Some of the subqueries may also be generated based on results of previously processed subqueries.

The subquery processing module 220 can be configured to process subqueries over the data sources 115. The subquery processing module 220 can further encrypt, based on the security profiles, the subqueries required to be encrypted prior to being submitted to the servers 110. The servers 110 can be pre-configured to process the subqueries according to one of the security levels and send the results of subqueries to the client 105. The subquery processing module 220 can further decrypt the results of the subqueries required to be decrypted based on the security profiles stored in database 210.

The response generation module 225 can be configured to generate, based on results of subqueries, a result for the query. The result for the query can be displayed in a plaintext format by the user interface module 205.

Example

An authorized user of a client device 105 may submit a query to the system 120 to find previous transactions (e.g., for the last 10 days) that were performed by and all credit card numbers used for the transactions by a client named John Doe. The system 120 may analyze the query and determine that three subqueries need to be sent to three data sources. The first data source can be configured to store personal information, for example names and addresses of clients performing the transactions and client codes. The second data source can be configured to store information concerning transactions and codes of clients. The third data source can be configured to store information concerning credit cards used for the transactions and the number of transactions.

The system 120 may generate a first subquery to retrieve the code of the client from the first data source. The first data source containing the personal information of the clients can be assigned a security profile with the security level 3. The system 120 may encrypt the first subquery, send the first subquery to a first server configured to read data of the first data source, and receive, from the first server, results of the subquery in an encrypted format. The results may include a client code.

The system 120 can generate a second subquery to retrieve transaction numbers from the second data source. The second data source can be assigned a security profile with the security level 1. According to the security level 1, the system 120 may sent unencrypted subquery to a second server configured to read data of the second data source and receive, from the second server, results of the subquery in a plaintext format. The results may include numbers of transactions.

The system 120 can further generate a third subquery to retrieve credit card information from the third data source. The third data source can be assigned a security profile with the security level 5. According to the security level 5, the system 120 may send an encrypted subquery to a third server configured to read data from the third data source and receive, from the third server, an encrypted result of the subquery. The system 120 may further decrypt the encrypted result. The system 120 can further combine the results of the first subquery, second subquery, and third subquery to generate results for the original query in a plaintext format.

Figure 4:
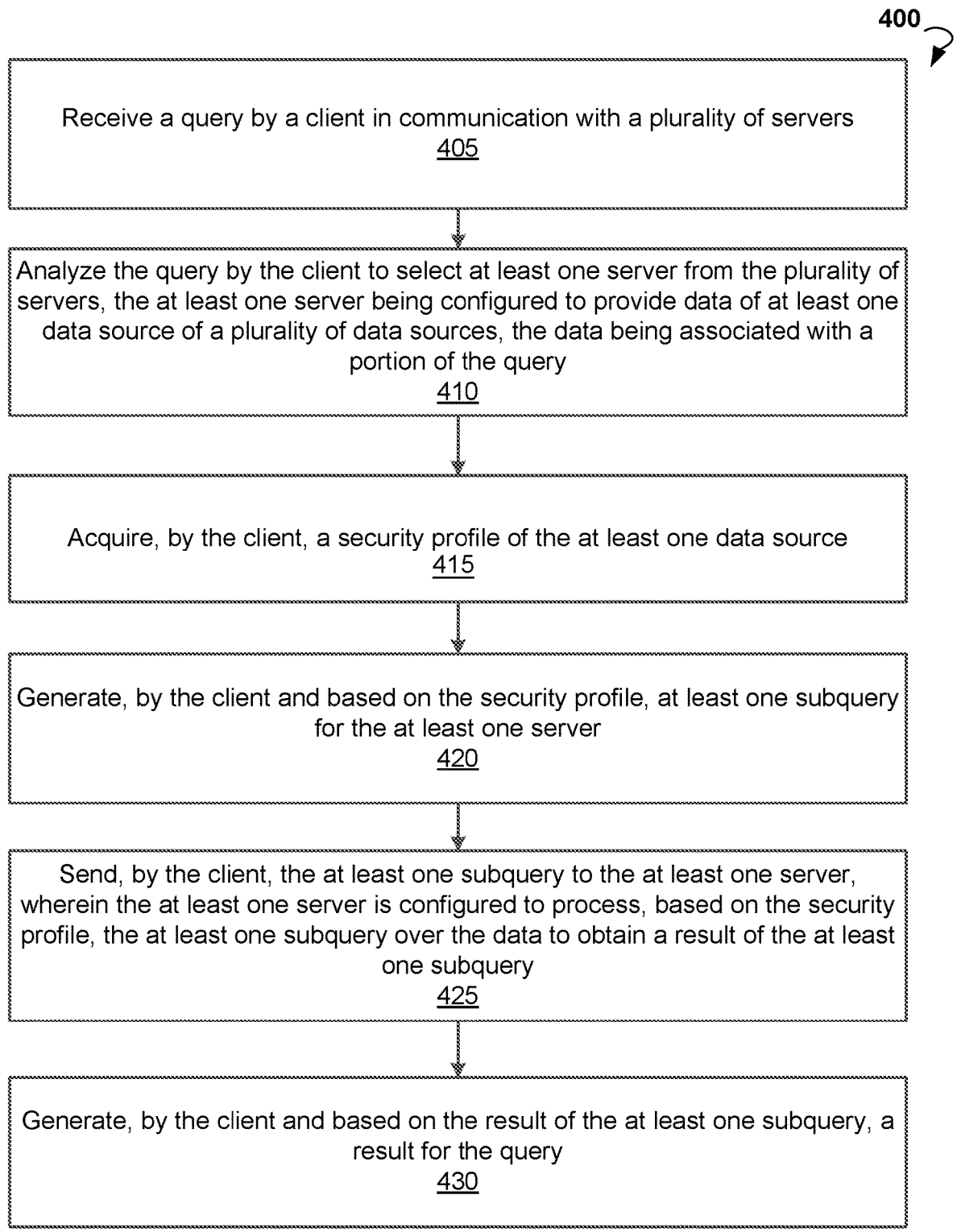
FIG. 4 is a flow chart of a method for query processing with adaptive risk decisioning, according to an example embodiment of the present disclosure.

FIG. 4 is a flow chart of an example method 400 for query processing with adaptive risk decisioning, according to some example embodiments. The method 400 can be performed within environment 100 illustrated in FIG. 1. Notably, the steps recited below may be implemented in an order different than described and shown in the FIG. 4. Moreover, the method 400 may have additional steps not shown herein, but which can be evident to those skilled in the art from the present disclosure. The method 400 may also have fewer steps than outlined below and shown in FIG. 4.

In block 405, the method 400 may commence with receiving a query by a client in communication with a plurality of servers. The servers can be in communication with a plurality of the data sources and configured to read data from the data sources. The query may include plaintext. In block 410, the method 400 may analyze, by the client, the query to determine at least one server from the plurality of the servers configured to provide data associated with a portion of the query. The server may read the data from a data source of a plurality of data sources. In block 415, the method 400 may acquire, by the client, a security profile of the data source. The security profile may include a security level for processing queries by the servers from the plurality of servers.

In block 420, the method 400 may generate, by the client and based on the security profile, at least one subquery for the server. In block 425, the method 400 may send the subquery to the server. The server can be configured to process, based on the security profile, the subquery over data to obtain results for the at least one subquery.

Based on the security profile, the subquery may be kept unencrypted and the server can execute the subquery over unencrypted data. Based on another security profile, the client may encrypt the subquery to generate an encrypted subquery and the server may execute the encrypted subquery over unencrypted data. Based on yet another security profile, the client may encrypt the subquery to generate an encrypted subquery and the server may execute the encrypted subquery over encrypted data.

Based on a further security profile, the client can encrypt the subquery to generate an encrypted subquery. The server can decrypt, in the TEE, the encrypted subquery and execute, in the TEE, the subquery over unencrypted data. According to yet another security profile, the client can encrypt the subquery to generate an encrypted subquery. The server can decrypt, in the TEE, the encrypted subquery and execute, in the TEE, the subquery over encrypted data. In block 430, the method 400 may conclude with generating, based on the results for the subquery, a result for the query.

Figure 5:
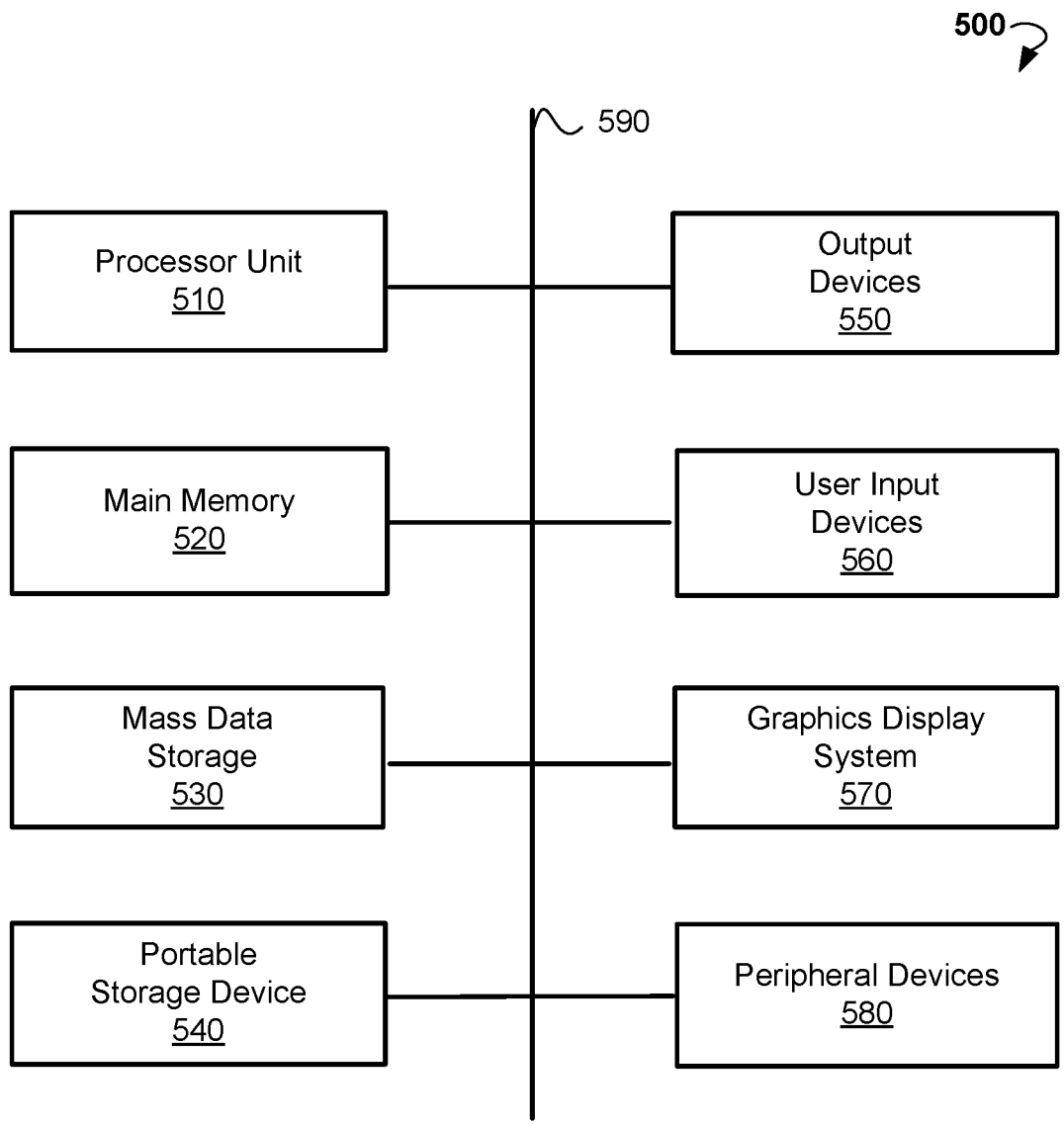
FIG. 5 is an example computer system that can be used to implement some embodiments of the present disclosure.

FIG. 5 illustrates an exemplary computer system 500 that may be used to implement some embodiments of the present disclosure. The computer system 500 of FIG. 5 may be implemented in the contexts of the likes of the client 105, the servers 110, and the data source 115. The computer system 500 of FIG. 5 includes one or more processor units 510 and main memory 520. Main memory 520 stores, in part, instructions and data for execution by processor units 510. Main memory 520 stores the executable code when in operation, in this example. The computer system 500 of FIG. 5 further includes a mass data storage 530, portable storage device 540, output devices 550, user input devices 560, a graphics display system 570, and peripheral devices 580.

The components shown in FIG. 5 are depicted as being connected via a single bus 590. The components may be connected through one or more data transport means. Processor unit 510 and main memory 520 is connected via a local microprocessor bus, and the mass data storage 530, peripheral device(s) 580, portable storage device 540, and graphics display system 570 are connected via one or more input/output (I/O) buses.

Mass data storage 530, which can be implemented with a magnetic disk drive, solid state drive, or an optical disk drive, is a non-volatile storage device for storing data and instructions for use by processor unit 510. Mass data storage 530 stores the system software for implementing embodiments of the present disclosure for purposes of loading that software into main memory 520.

Portable storage device 540 operates in conjunction with a portable non-volatile storage medium, such as a flash drive, floppy disk, compact disk, digital video disc, or Universal Serial Bus (USB) storage device, to input and output data and code to and from the computer system 500 of FIG. 5. The system software for implementing embodiments of the present disclosure is stored on such a portable medium and input to the computer system 500 via the portable storage device 540.

User input devices 560 can provide a portion of a user interface. User input devices 560 may include one or more microphones, an alphanumeric keypad, such as a keyboard, for inputting alphanumeric and other information, or a pointing device, such as a mouse, a trackball, stylus, or cursor direction keys. User input devices 560 can also include a touchscreen. Additionally, the computer system 500 as shown in FIG. 5 includes output devices 550. Suitable output devices 550 include speakers, printers, network interfaces, and monitors.

Graphics display system 570 include a liquid crystal display (LCD) or other suitable display device. Graphics display system 570 is configurable to receive textual and graphical information and processes the information for output to the display device.

Peripheral devices 580 may include any type of computer support device to add additional functionality to the computer system.

The components provided in the computer system 500 of FIG. 5 are those typically found in computer systems that may be suitable for use with embodiments of the present disclosure and are intended to represent a broad category of such computer components that are well known in the art. Thus, the computer system 500 of FIG. 5 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

The processing for various embodiments may be implemented in software that is cloud-based. In some embodiments, the computer system 500 is implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers)

and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 500, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A method for query processing with adaptive risk decisioning, the method comprising:
receiving a query by a client in communication with a plurality of servers, each of the plurality of servers having a level of security each of the plurality of servers having a data source, wherein the data source has a data source security profile consisting of an encryption status, and wherein the level of security for each server is determined by a communication encryption between the client and the plurality of servers, the data source security profile, and an execution environment of the server;
acquiring, by the client, a security profile of each of the plurality of servers and the data source for each of the plurality of servers;
generating, by the client and based on the security profile, two or more subqueries from the query, each of the two or more subqueries having a data sensitivity;
sending, by the client, a first subquery of the two or more subqueries to a first server of the plurality of servers when the data sensitivity of the first subquery corresponds to the level of security of the first server and a first data source, and a second subquery of the two or more subqueries to a second server of the plurality of servers when the data sensitivity of the second subquery corresponds to the level of security of the second server and a second data source, the first server processing the first subquery and the second server processing the second subquery; and
providing a result for the query, the result comprising combined output from the first server and the second server.

2. The method of claim 1, wherein the query includes plaintext.

3. The method of claim 1, further comprising storing, by the client, a database of security profiles of the plurality of servers and data sources.

4. The method of claim 3, further comprising providing, by the client, a user interface to configure the security profiles of the plurality of servers and data sources.

5. The method of claim 1, wherein:
the first subquery is unencrypted; and
the first server is configured to execute the first subquery over unencrypted data of the first data source associated with the first server.

6. The method of claim 1, wherein:
the generating the two or more subqueries includes encrypting, based on an encryption scheme, the second subquery to generate an encrypted subquery; and
the second server is configured to execute the encrypted subquery over unencrypted data of the second data source of the second server.

7. The method of claim 1, wherein:
the generating the two or more subqueries includes encrypting, based on an encryption scheme, the second subquery to generate an encrypted subquery; and
the second server is configured to execute the encrypted subquery over encrypted data of the second data source of the second server.

8. The method of claim 7, wherein the encryption scheme includes a homomorphic encryption.

9. The method of claim 1, wherein:
the generating the two or more subqueries includes encrypting, based on an encryption scheme, the second subquery to generate an encrypted subquery; and
the second server is configured to:
decrypt, in a Trusted Execution Environment (TEE) and based on the encryption scheme, the encrypted subquery to obtain an unencrypted subquery;
execute, in the TEE, the unencrypted subquery over unencrypted data of the second data source of the second server to obtain an unencrypted result;
encrypt, in the TEE and based on the encryption scheme, the unencrypted result to obtain an encrypted result of the subquery; and
send the encrypted result of the subquery to the client, wherein the client is configured to decrypt, based on the encryption scheme, the encrypted result of the subquery to obtain the result of the subquery.

10. The method of claim 1, wherein:
the generating the two or more subqueries includes encrypting, based on an encryption scheme, the second subquery to generate an encrypted subquery; and
the second server is configured to:
decrypt, in a Trusted Execution Environment (TEE) and based on the encryption scheme, the encrypted subquery to obtain an unencrypted subquery;
execute, in the TEE, the unencrypted subquery over encrypted data of the second data source to obtain an encrypted result;
encrypt, in the TEE and based on the encryption scheme, the encrypted result to obtain doubly-encrypted result; and
send the doubly-encrypted result to the client, wherein the client is configured to decrypt the doubly-encrypted result to obtain the result of the subquery.

11. A system for query processing with adaptive risk decisioning, the system comprising:
at least one processor; and
a memory communicatively coupled with the at least one processor, the memory storing instructions, which when executed by the at least one processor performs a method comprising:
receiving a query by a client in communication with a plurality of servers, each of the plurality of servers having a level of security, each of the plurality of servers having at least one data source, wherein the data source has a data source security profile consisting of an encryption status, and wherein the level of security for each server is determined by a communication encryption between the client and the plurality of servers, the data source security profile, and an execution environment of the server;

acquiring, by the client, a security profile of each of the plurality of servers and the data source for each of the plurality of servers;

generating, by the client and based on the security profile, two or more subqueries from the query, each of the two or more subqueries having a data sensitivity;

sending, by the client, a first subquery of the two or more subqueries to a first server of the plurality of servers when the data sensitivity of the first subquery corresponds to the level of security of the first server and a first data source, and a second subquery of the two or more subqueries to a second server of the plurality of servers when the data sensitivity of the second subquery corresponds to the level of security of the second server and a second data source, the first server processing the first subquery and the second server processing the second subquery; and providing a result for the query, the result comprising combined output from the first server and the second server.

12. The system of claim 11, wherein the query includes plaintext.

13. The system of claim 11, wherein the method further comprises:

storing, by the client, a database of security profiles of the plurality of servers and data sources; and providing, by the client, a user interface to configure the security profiles of the plurality of servers and data sources.

14. The system of claim 11, wherein:
the first subquery is unencrypted; and
the first server is configured to execute the first subquery over unencrypted data of the first data source associated with the first server.

15. The system of claim 11, wherein:
the generating the two or more subqueries includes encrypting, based on an encryption scheme, the second subquery to generate an encrypted subquery; and
the second server is configured to execute the encrypted subquery over unencrypted data of the second data source of the second server.

16. The system of claim 11, wherein the processing includes:
the generating the two or more subqueries includes encrypting, based on an encryption scheme, the second subquery to generate an encrypted subquery; and
the second server is configured to execute the encrypted subquery over encrypted data of the second data source of the second server.

17. The system of claim 16, wherein the encryption scheme includes a homomorphic encryption.

18. The system of claim 11, wherein:
the generating the two or more subqueries includes encrypting, based on an encryption scheme, the second subquery to generate an encrypted subquery; and
the second server is configured to:
decrypt, in a Trusted Execution Environment (TEE) and based on the encryption scheme, the encrypted subquery to obtain an unencrypted subquery;
execute, in the TEE, the unencrypted subquery over unencrypted data of the second data source of the second server to obtain an unencrypted result;
encrypt, in the TEE and based on the encryption scheme, the unencrypted result to obtain an encrypted result of the subquery; and
send the encrypted result of the subquery to the client, wherein the client is configured to decrypt, based on the encryption scheme, the encrypted result of the subquery to obtain the result of the subquery.

19. The system of claim 11, wherein:
the generating the two or more subqueries includes encrypting, based on an encryption scheme, the second subquery to generate an encrypted subquery; and
the second server is configured to:
decrypt, in a Trusted Execution Environment (TEE) and based on the encryption scheme, the encrypted subquery to obtain an unencrypted subquery;
execute, in the TEE, the unencrypted subquery over encrypted data of the second data source of the second server to obtain an encrypted result;
encrypt, in the TEE and based on the encryption scheme, the encrypted result to obtain doubly-encrypted result; and
send the doubly-encrypted result to the client, wherein the client is configured to decrypt the doubly-encrypted result to obtain the result of the subquery.

20. A non-transitory computer-readable storage medium having embodied thereon instructions, which when executed by at least one processor, perform steps of a method, the method comprising:

receiving a query by a client in communication with a plurality of servers, each of the plurality of servers having a level of security, each of the plurality of servers having a data source, wherein the data source has a data source security profile consisting of an encryption status, and wherein the level of security for each server is determined by a communication encryption between the client and the plurality of servers, the data source security profile, and an execution environment of the server;

acquiring, by the client, a security profile of each of the plurality of servers and the data source for each of the plurality of servers;

generating, by the client and based on the security profile, two or more subqueries from the query, each of the two or more subqueries having a data sensitivity;

sending, by the client, a first subquery of the two or more subqueries to a first server of the plurality of servers when the data sensitivity of the first subquery corresponds to the level of security of the first server and a first data source, and a second subquery of the two or more subqueries to a second server of the plurality of servers when the data sensitivity of the second subquery corresponds to the level of security of the second server and a second data source, the first server processing the first subquery and the second server processing the second subquery; and providing a result for the query, the result comprising combined output from the first server and the second server.

* * * * *